United States Patent
Eshraghian

[11] 3,918,035
[45] Nov. 4, 1975

[54] QUANTITY LEVEL GAUGE

[75] Inventor: Kamran Eshraghian, Hillcrest, Australia

[73] Assignee: U.S. Philips Corporation, New York, N.Y.

[22] Filed: Oct. 24, 1972

[21] Appl. No.: 299,940

[30] Foreign Application Priority Data
Oct. 25, 1971 Australia............................. 6765/71
Nov. 12, 1971 Australia............................. 7002/71

[52] U.S. Cl........... 340/244 R; 340/228 R; 340/236
[51] Int. Cl.² ............................................ G08B 21/00
[58] Field of Search............ 340/244 R, 239 R, 236, 340/248, 253, 228 R; 324/133

[56] References Cited
UNITED STATES PATENTS

| | | |
|---|---|---|
| 3,099,827 | 7/1963 | Wu ................................ 324/133 X |
| 3,573,779 | 4/1971 | McDaniel et al. ............... 340/248 C |
| 3,633,195 | 1/1972 | Menzel ......................... 340/253 A X |
| 3,699,560 | 10/1972 | Meunier et al. ................. 340/239 R |
| 3,699,560 | 10/1972 | Meunier et al. ................. 340/239 R |
| 3,755,801 | 8/1973 | Milo .............................. 340/244 R |

*Primary Examiner*—John W. Caldwell
*Assistant Examiner*—Daniel Myer
*Attorney, Agent, or Firm*—Frank R. Trifari; Bernard Franzblau

[57] ABSTRACT

Indicating apparatus comprising a plurality of indicator lamps connected to respective outputs of a plurality of voltage comparators. The comparators have a first input connected to a common input supplied with an input voltage related to a quantity to be measured and a second input connected to respective reference voltages whereby each comparator energizes its respective lamp when the input voltage equals its respective reference voltage.

13 Claims, 4 Drawing Figures

QUANTITY LEVEL GAUGE

BACKGROUND OF THE INVENTION

The present invention relates to a quantity level gauge comprising a plurality of light emitting indicators for displaying the quantity level and switching means, connected to each indicator, acting upon a predetermined quantity level. The term "quantity level gauge" includes inter alia fluid level gauges, temperature gauges, and pressure gauges.

The present invention furnishes improved indication means for such gauges.

In known gauges of the kind to which the invention relates, a voltage related to the level of the quantity being measured is employed to control the movement of a needle over the scale of a moving coil instrument and in many instances such instruments are expensive, are difficult to maintain and are difficult for an operator to read in the environment in which they are employed. The present invention provides an indication which does not suffer from the drawbacks of the known gauges. Although not restricted thereto, the present invention is particularly useful for use as the fuel gauge of an automobile as suggested in the U.S. Pat. No. 3,110,882.

SUMMARY OF THE INVENTION

According to the present invention there is provided a switching means comprising a plurality of a voltage-comparators each with a first input connected to a common input fed with an input voltage related to the quantity level, a second input connected to a predetermined reference voltage, diifferent for each voltage comparator, and with an output supplying an energizing signal for the associated indicator when the input voltage is in excess of the respective reference voltage.

In one form the quantity level guage is arranged so that energization of each indicator depends upon the state of response of only that comparator of the plurality with which the indicator is associated irrespective of the state of response or non-response of the remaining comparators of the plurality.

In this form the individual comparator stages may be proportioned so that the associated indicator is continuously energized when the input voltage exceeds the predetermined magnitude at which the stage is responsive and the intensity of continuous energization increases as the input voltage increases in magnitude beyond the predetermined magnitude. In addition, if desired, means may be included for intermittently supplying energy to a chosen indicator whereby the chosen indicator is intermittently energized in the absence of continuous energization or whereby the chosen indicator is intermittently energized to a higher intensity when the intensity of the continuous energization falls below a particular level.

In another form, the quantity level gauge may be arranged so that energization of each indicator depends not only upon the state of response of that comparator with which the indicator is associated but also depends upon the state of response or non-response of the other comparators of the plurality, whereby only one indicator is energized at a given time.

Preferably, but not necessarily, in this second form the quantity level gauge is arranged so that the comparators are coupled to their associated indicators via a multi-input/multi-output decoder circuit whereby energization of each respective indicator is produced by a different decoder circuit output, the decoder circuit enabling only one decoder output to produce energization of an indicator at a given time, the output of each comparator of the plurality being fed to a different input of the decoder circuit whereby the combined output of the plurality of comparators provides encoded information determining which, if any, decoder output produces energization of an indicator.

If desired, a chosen comparator may be provided with auxiliary means rendering the chosen comparator intermittently responsive in the absence of an input voltage in excess of the predetermined voltage to which the chosen comparator is responsive.

However, as an alternative, means may be included for intermittently supplying energy to a chosen indicator whereby the chosen indicator is intermittently energized in the absence of continuous energization from the associated comparator stage.

In either form of the invention, it is advantageous to provide means to minimize erratic indication which may otherwise be produced owing to variation of the quantity level about a mean level. Such means may be in the form of a circuit in which the voltage related to the quantity level is fed to the said common input, the circuit having a time constant of between 1 second and 10 seconds. Alternatively, each comparator stage may be proportioned so that the stage is responsive to a predetermined voltage magnitude and remains so responsive until the input voltage falls to a fixed level below the predetermined voltage magnitude.

BRIEF DESCRIPTION OF THE DRAWINGS

Embodiments of the present invention will now be described, by way of example only, with reference to the accompanying diagrammatic drawings, in which.

DETAILED DESCRIPTION OF THE PREFERRED EMBODIMENT

Figure 1:
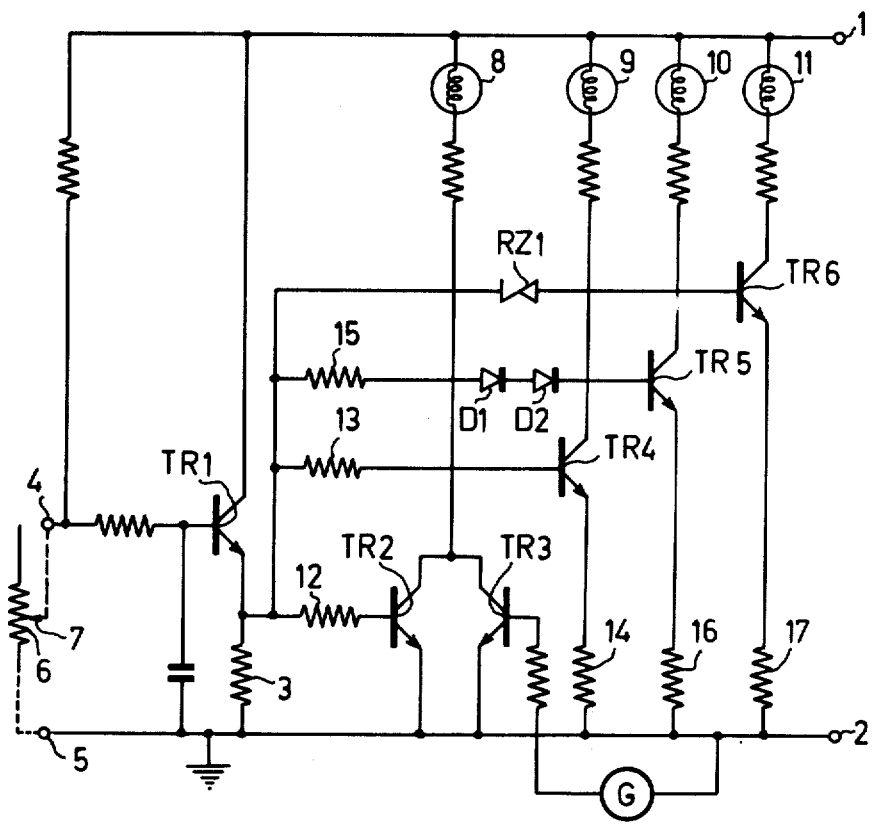
FIG. 1 illustrates a quantity level gauge in accordance with the present invention suitable for use as a fuel gauge in automobiles.

In FIG. 1, the collector of the input transistor TR1 is connected directly to the positive terminal 1 of a supply voltage source (not shown) the negative terminal 2 of which is connected to ground. The emitter of the transistor TR1 is connected to the terminal 2 via the emitter resistance 3. Via the terminals 4 and 5, a sensor 6 in the form of a resistance provided with an adjustable contact 7 is included in the base bias network of the transistor Tr1. In known manner, the sensor 6 is located at the fuel tank of the vehicle and the position of the contact 7 on the resistance is automatically adjusted in accordance with the amount of fuel present in the tank.

The emitter of the transistor TR1 is coupled to the base electrodes of the transistors TR2, TR4, TR5 and TR6 each of which is connected to function as a voltage comparator stage. A light emitting indicator 8, in the form of an incandescent lamp, is provided in the collector circuit of the transistor TR2 and in similar manner, light emitting indicators 9, 10 and 11 are provided in the respective collector circuits of the transistors TR4, TR5 and TR6. The indicator 8 is also included in the collector circuit of the transistor TR3 which forms together with the transistor TR2 a single voltage comparator stage. To the base of the transistor TR3 an intermittent voltage is continuously supplied from the low frequency generator G.

In operation, a positive voltage is produced at the base of the transistor TR1, the magnitude of which depends upon the level of fuel in the tank. The base voltage of the transistor TR1 increases with an increase of fuel level and results in a voltage being produced across the emitter resistance 3 which is also related to the fuel level and which provides an input voltage for the transistors TR2, TR4, TR5 and TR6.

The circuitry associated with the transistor TR2 is so proportioned that current flows in its collector-emitter path only when the voltage across the resistance 3 is in excess of a particular magnitude. Accordingly, the indicator 8 is continuously energised by the collector-emitter current of the transistor TR2 only when the voltage across the resistance 3 is in excess of that particular magnitude. In this regard, the value of the resistance 12 is chosen in relation to the characteristics of the transistor TR2 and the value of the resistance 3 such that the lamp 8 glows brightly and continuously when the fuel tank contents exceed one quarter of its capacity.

In somewhat similar manner, the circuitry associated with the transistor TR4 is so proportioned that current flows in its collector-emitter path only when the voltage across the resistance 3 is in excess of a particular magnitude. Accordingly, the indicator 9 is continuously energised by the collector-emitter current of the transistor TR4 only when the voltage across the resistance 3 is in excess of that particular magnitude. In this regard, the values of resistances 13 and 14 are chosen such that the lamp 9 glows brightly and continuously when the fuel tank contents exceed one half of its capacity.

Also, in somewhat similar manner the circuitry associated with the transistor TR5 is so proportioned that current flows in its collector-emitter path only when the voltage across the resistance 3 is in excess of a particular magnitude. Accordingly, the indicator 10 is continuously energized by the collector-emitter current of the transistor TR5 only when the voltage across the resistance 3 is in excess of that particular magnitude. In this regard, the value of the resistances 15 and 16 and the characteristics of the diodes D1 and D2 are so chosen that the lamp 10 glows brightly and continuously when the fuel tank contents exceed three quarters of its capacity.

Again, in somewhat similar manner, the circuitry associated with the transistor TR6 is so proportioned that current flows in its collector-emitter path only when the voltage across the resistance 3 is in excess of a particular magnitude. Accordingly, the indicator 11 is continuously energized by the collector-emitter current of the transistor TR6 only when the voltage across the resistance 3 is in excess of that particular magnitude. In this regard, the resistance 17 and the characteristics of the zener diode RZ1 are chosen so that the lamp 11 glows brightly and continuously only when fuel tank contents are at or near its full capacity.

It is intended for the lamps 8, 9, 10 and 11 to be arranged in an array for respectively illuminating the segments of a vertical scale.

When the tank is full and the voltage present across the resistance 3 is at a maximum, all the lamps will glow brightly and continuously. As the amount of fuel decreases, the voltage across the resistance 3 decreases in a corresponding manner and the intensity of energization of the lamp 11 diminishes. The process continues until the fuel tank is approximately three quarters full whereupon the lamp 11 is completely extinguished. As the contents of the fuel tank decrease further, the intensity of energization of the lamps 10 and 9 similarly decreases and are respectively extinguished at the half-full level and at the quarterfull level respecively.

At the quarter-full level, the lamp 8 glows brightly and continuously whereas the lamps 9, 10 and 11 are completely extinguished. As the fuel level falls below the quarter-full level continuous energization of the lamp 8 diminishes in intensity. However, since the lamp 8 is also incorporated in the collector circuit of the transistor TR3 which provides a source of intermittent energization current, as the continuous energisation current from the collector-emitter path of the transistor TR2 diminishes, the lamp 8 commences to flash due to the intermittent flow of current from the collector-emitter path of the transistor TR3, the flashing of the lamp 8 becoming more and more evident as the fuel level decreases and the flow of continuous energization current decreases.

Figure 2:
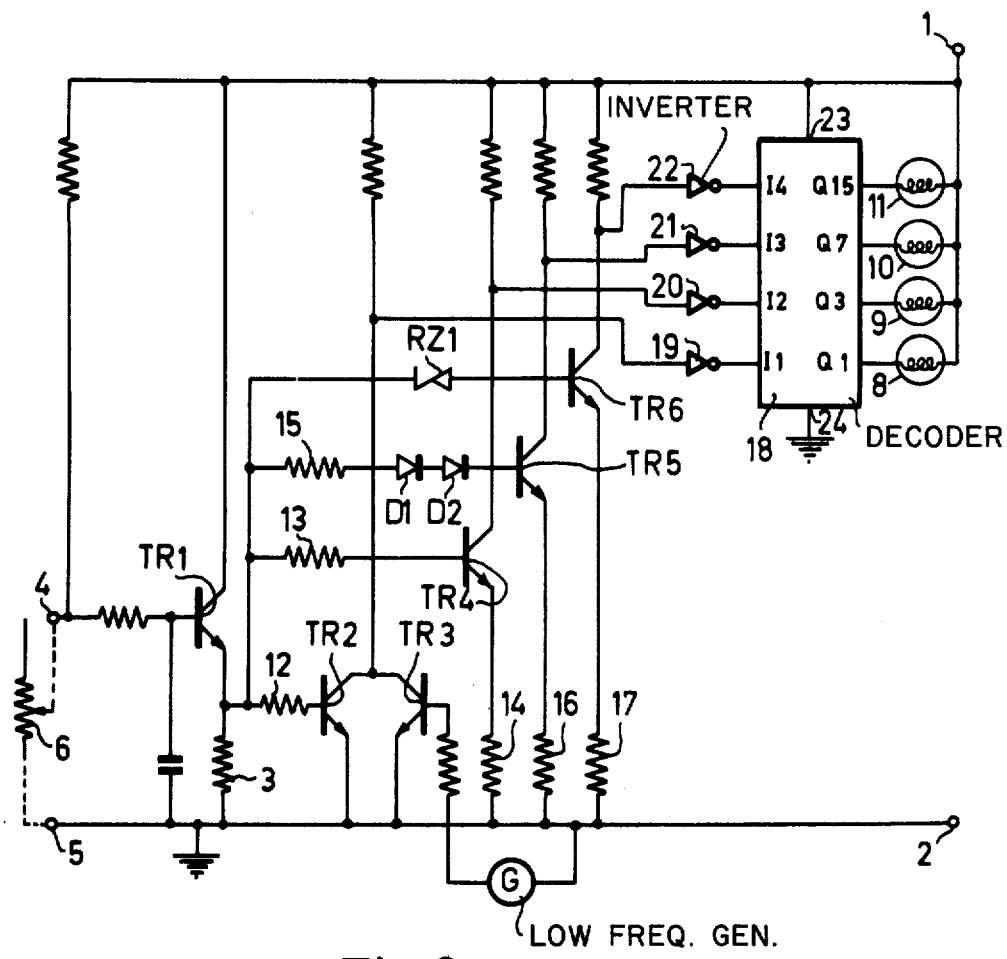
FIG. 2 illustrates a modification of the embodiment of FIG. 1 to include a decoder stage.

Referring to FIG. 2, parts of the circuit illustrated are substantially identical to that illustrated in FIG. 1 and accordingly, like numerals denote like components.

In FIG. 2, the indicators 8, 9, 10 and 11, previously depicted in FIG. 1 as being in the collector load circuits of transistors TR2, TR4, TR5 and TR6 respectively, are connected respectively between output terminals Q1, Q3, Q7 and Q15 of a decoder element 18 in the form of a single one-of-sixteen decoder, Philips Type FJH 341 and the positive terminal 1. Input terminals I1, I2, I3 and I4 of the decoder 18 are connected via inverter stages 19, 20, 21 and 22 to the collector electrodes of transistors TR2, TR4, TR5 and TR6 respectively. Terminals 23 and 24 of the decoder are connected to the positive terminal 1 and ground respectively Except when referring to the output terminals of the decoder 18, the terms "high" and "low" as used in the following description are understood to relate respectively to the more positive voltage and the less positive voltage. Thus, when referring to transistors TR2, TR4, TR5 and TR6 the terms "high" and "low" relate respectively to the collector voltage of the appropriate transistor when that transistor is non-conducting and to the collector voltage of the appropriate transistor when that transistor is conducting.

Since the collector electrodes of transistors TR2, TR4, TR5 and TR6 are connected via the inverter stages 19, 20, 21 and 22 to input terminals I1, I2, I3 and I4 respectively of the decoder 18, the terms "high" and "low" as applied to each input terminal of the decoder 18 refer to the output voltage level of the associated inverter stage when a "low" or "high", as hereinbefore defined, is applied to the input thereof from the collector electrode of the transistor to which it is connected.

However, when referring to the output terminals Q1, Q3, Q7 and Q15 of the decoder 18, the terms "high" and "low" are understood to relate respectively to a high impedance path or low impedance path provided between the output terminal concerned and ground that is terminal 24.

The operation of the decoder 18 is illustrated by the truth table set out below:

| STAGE | Collector Electrodes | | | | Decoder Inputs | | | | Decoder Outputs | | | |
|-------|------|-----|-----|-----|----|----|----|----|----|----|----|-----|
|       | TR2  | TR4 | TR5 | TR6 | I1 | I2 | I3 | I4 | Q1 | Q3 | Q7 | Q15 |
| A | L | H | H | H | H | L | L | L | L | H | H | H |
| B | L | L | H | H | H | H | L | L | H | L | H | H |
| C | L | L | L | H | H | H | H | L | H | H | L | H |
| D | L | L | L | L | H | H | H | H | H | H | H | L |

H = High    L = Low

The first section of the truth table illustrates the state of the collector electrodes of transistors TR2, TR4, TR5 and TR6. The second section of the truth table illustrates the state of the input terminals I1, I2, I3 and I4 of the decoder 18 and the third section illustrates the states of selected outputs of Q1, Q3, Q7 and Q15 of the decoder 18.

During operation of the embodiment of FIG. 2, a positive voltage is produced at the base of transistor TR1, the magnitude of which depends upon the level of fuel in the tank. The base voltage of the transistor TR1 increases with an increase of the fuel level and results in a voltage being produced across emitter resistance 3 which is also related to the fuel level and provides an input voltage for the transistors TR2, TR4, TR5 and TR6.

The circuitry associated with the transistor TR2 is so proportioned that transistor TR2 turns on only when the voltage across the resistance 3 is in excess of a particular magnitude. Accordingly, a "high" is produced at the input terminal I1 of the decorder 18 when the voltage across the resistance 3 is in excess of that particular magnitude and a "low" is produced at the input terminal I1 when the voltage across the resistance 3 is below that particular magnitude. In this regard, the value of the resistance 12 is chosen in relation to the characteristics of the transistor TR2 and the value of the resistance 3 such that a high is produced at the input terminal I1 of the decoder 18 whenever the fuel tank content exceeds one quarter of its capacity.

In somewhat similar manner, the circuitry associated with the transistor TR4 is so proportioned that transistor TR4 turns on only when the voltage across the resistance 3 is in excess of a second particular magnitude. Accordingly, a high is produced at the input terminal I2 of the decoder 18 when the voltage across the resistance 3 is in excess of that second particular magnitude and a "low" is produced at the input terminal I2 when the voltage acorss the resistance 3 is below that second particular magnitude. In this regard, the value of the resistances 13 and 14 are chosen such that a high is produced at the input terminal I2 of the decoder 18 whenever the fuel tank content exceeds one half of its capacity.

Also, in somewhat like manner the circuitry associated with the transistor TR5 is so proportioned that transistor TR5 turns on only when the voltage across the resistance 3 is in excess of a third particular magnitude. Accordingly, a high is produced at the input terminal I3 of the decoder 18 when the voltage across the resistance 3 is in excess of that third particular magnitude and a low is produced at the input terminal I3 when the voltage across the resistance 3 is below that third particular magnitude. In this regard, the value of the resistances 15 and 16 and the characteristics of the diodes D1 and D2 are chosen such that a high is produced at the input terminal I3 of the decoder 18 whenever the fuel tank content exceeds three quarters of its capacity.

Again, in somewhat similar manner, the circuitry associated with transistor TR6 is so proportioned that transistor TR6 turns on only when the voltage across the resistance 3 is in excess of a fourth particular magnitude. Accordingly, a high is produced at the input terminal I4 of the decoder 18 when the voltage across the resistance 3 is in excess of that fourth particular magnitude and a low is produced at the input terminal I4 when the voltage across the resistance 3 is below that fourth particular magnitude. In this regard, the value of the resistance 17 and the characteristics of the zener diode RZ1 are chosen such that a high is produced at the input terminal I4 of the decoder 18 whenever the fuel tank content is at or near its full capacity.

As will be apparent from the foregoing description, for each different level of the contents of the fuel tank in excess of the quarter full condition, a different output terminal of the decoder 18 is low since one or more of the input terminals I1, I2, I3 and I4 are high. The indicator associated with the low output terminal is thus energized. Of course, only one indicator can be energized at a given time but the particular indicator which is energized depends upon the number of the inputs I1, I2 I3 and I4 of the decoder 18 which are in the high state.

It is intended for the indicators 8, 9, 10 and 11 to be arranged in an array for consecutively illuminating segments on a vertical scale.

When the fuel tank is full and the voltage present across the resistance 3 is at a maximum a low is produced at output terminal Q15 of the decoder and accordingly, only indicator 11 is energized. This condition coincides with stage D of the truth table. As the amount of fuel decreases the voltage across resistance 3 decreases in a corresponding manner and at a particular level the input terminal I4 of the decoder 18 ceases to be high and the low present at output terminal Q15 is transferred to the output terminal Q7. In this condition, which coincides with stage C of the truth table, only indicator 10 is energized.

When the amount of fuel decreases to approximately the three quarter full level, input terminal I3 of the decoder 18 ceases to be high and the low present at output terminal Q7 is transferred to output terminal Q3. In this condition, and which condition coincides with stage B of the truth table, only indicator 9 is energized.

In a similar manner, when the amount of fuel decreases to approximately the half full level, input terminal I3 of the decoder 18 ceases to be high and the low present at output terminal Q3 is transferred to output terminal Q1. In this condition, which coincides with stage A of the truth table, only indicator 8 is energized.

As the amount of fuel falls below the quarter full level, input terminal I1 of the decoder 18 ceases to be high and the low present at output terminal Q1 disappears. In this condition none of the indicators are energized. However, since input terminal I1 of the decoder 18 is connected via the inverter stage 19 to the collector electrode of transistor TR3 which is rendered alternately conductive and non-conductive by the low frequency generator G, the input terminal I1 goes alternately high and low. Thus, as will be apparent, output terminal Q1 goes alternately low and high and accordingly, indicator 8 is intermittently energized as the state of the decoder 18 intermittently coincides with the stage A of the truth table.

Figure 3:
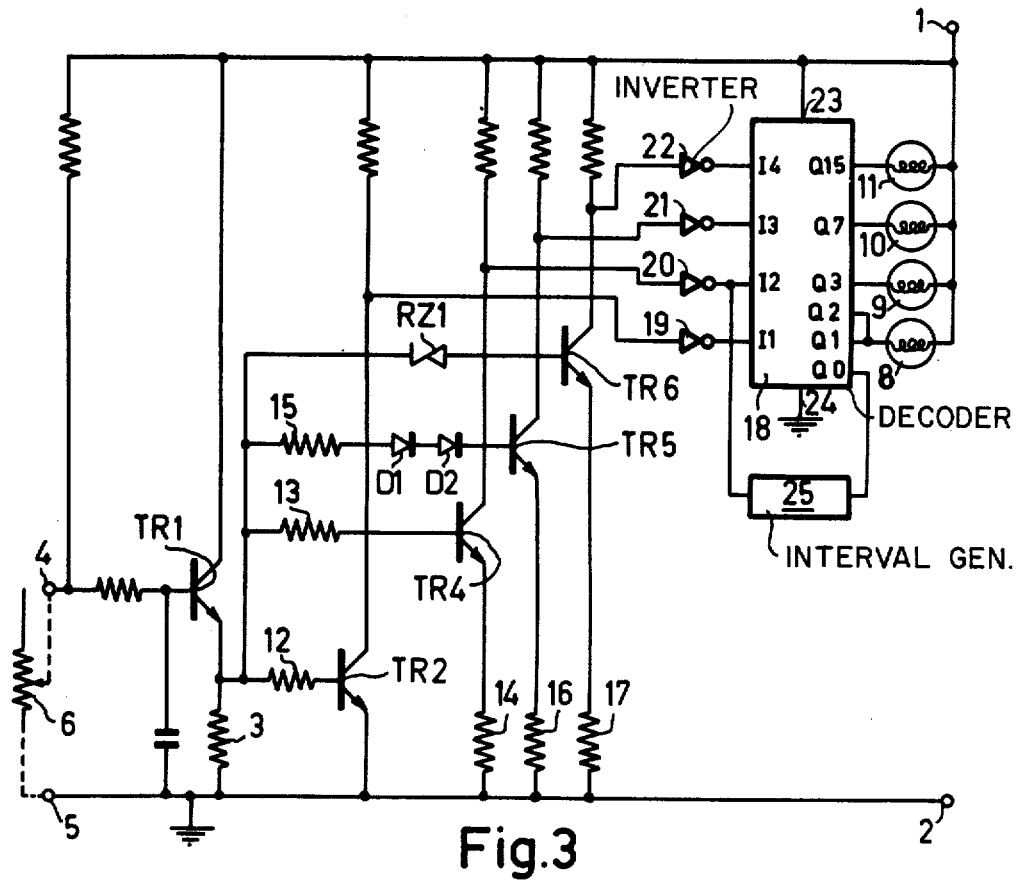
FIG. 3 illustrates the embodiment of FIG. 2 modified to include an alternative means for intermittent energization of the indicators.

As alternative arrangement for intermittent energisation of the indicator 8 when the contents of the fuel tank fall below the quarter full level is illustrated in FIG. 3, where an interval generator 25 is coupled to the decoder 18.

The operation of the decoder 18 is given in the truth table appearing below, which table is substantially identical to the truth table given in the description relating to FIG. 2, but modified slightly to illustrate the functions of output terminals Q0 and Q2.

The interval generator is of known kind which upon application of a low to its input is triggered so as to produce after a period determined by the generator characteristics a single positive going pulse of fixed duration.

tor 8, the indicator 8 is energised each time that the output terminal Q2 goes low. The frequency of energisation of the indicator 8, that is the flashing of the indicator 8, is determined by the generator characteristics.

The level of fuel in the fuel tank of a motor vehicle when traversing undulating terrain is subject to variation about a mean level, thus producing an undesired erratic indication. This drawback can be overcome to some extent by the provision of "baffle plates" in the fuel tank to reduce the variations.

In a still further variation of the embodiments of the invention thus described and to avoid the fitting of baffle plates, the voltage related to the quantity level is fed to the common input of each of the embodiments via a circuit having a time constant in excess of the period of undesired erratic indication. Conveniently, this circuit may take the form of a resistance-capacitance network having a time constant of between 1 second and 10 seconds.

Where however the variations are excessive, for example, when the vehicle is rapidly accelerating or decelerating, the resistance-capacitance network may not provide adequate dampening. With such variations, when a quantity level gauge of the type depicted in FIGS. 2 or 3 is used and the amount of fuel is greater than a predetermined level, for example, the half-full level, the indicator 3 associated with that level may be extinguished and the adjacent indicator 8 momentarily energised.

| Collector Electrodes | | | | Decoder Inputs | | | | | | Decoder Outputs | | | |
|---|---|---|---|---|---|---|---|---|---|---|---|---|---|
| TR2 | TR4 | TR5 | TR6 | L1 | L2 | L3 | L4 | Q0 | Q1 | Q2 | Q3 | Q7 | Q15 |
| H | H | H | H | L | L | L | L | L | H | H | H | H | H |
| L | H | H | H | H | L | L | L | H | L | H | H | H | H |
| H | H | H | H | L | H | L | L | H | H | L | H | H | H |
| L | L | H | H | H | H | L | L | H | H | H | L | H | H |
| L | L | L | H | H | H | H | L | H | H | H | H | L | H |
| L | L | L | L | H | H | H | H | H | H | H | H | H | L |

H = High   L = Low

In FIG. 3, the input of the generator 25 is connected to the output terminal Q0 of the decoder 18, whereas the output of the interval generator 25 is connected to the input terminal I2 of the decoder 18.

In this arrangement, as the amount of fuel falls below the quarter full level, the input terminal I1 of the decoder ceases to be high and the low present at output terminal Q1 is transferred to output terminal Q0 and none of the indicators are energised.

The low produced at the output terminal Q0 of the decoder 18 is arranged to trigger the interval generator 25. After a period determined by the generator characteristics a high is produced by the interval generator 25 and supplied to input terminal I2 of the decoder 18. This in turn produces a low at the output terminal Q2 and a high at output terminal Q0. After a further period, also determined by the generator characteristics, a low is supplied by the interval generator 25 to the input terminal I2 of the decoder 18. Consequently, the output terminal Q2 of the decoder 18 goes high and output terminal Q0 goes low. The interval generator 25 is now triggered for another cycle of operation and the process continues to be repeated so long as the amount of fuel in the fuel tank is below the quarter full level.

Figure 4:
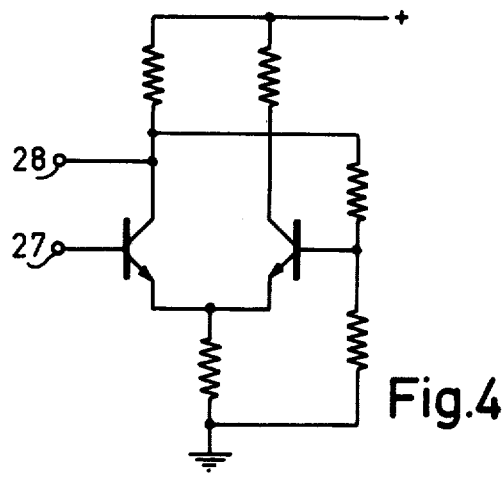
FIG. 4 illustrates a modification of part of the circuit of the embodiments of FIGS. 2 and 3 adapted to minimize erratic indications in the level of the quantity being measured.

Since output terminal Q2 of the decoder 18 is connected to output terminal Q1 and hence to the indica- As an alternative to the resistance-capacitance network to obviate the above difficulty, the transistors TR1, TR4, TR5 and TR6 together with respective circuitry may each be replaced by an emitter coupled binary having a loop gain greater than unity, as is illustrated in FIG. 4.

As will be apparent to persons skilled in the art the emitter coupled binary may be designed such that the output voltage at terminal 28, normally at a high voltage level, hereinafter referred to as "high", makes a rapid transition to a low voltage level, hereinafter referred to as low, when the voltage input terminal 27 is in excess of a predetermined level. This predetermined level as applied to the above exemplary situation refers to the voltage applied to input terminal 27 which relates to the half-full level. And, the voltage level required to be applied to the input terminal 27 in order to change the state of output terminal 28 from low to high will, of course, be designed such that the difference between this level and the predetermined level is in excess of the maximum variation expected.

As is known, the emitter coupled binary described above may be replaced by other types of circuits which exhibit hysteresis.

Many variations of the embodiments thus described will be apparent to persons skilled in the art. For instance, the number of stages is not limited to four and any desired number of indication stages may be employed. As a further variation, in respect of the embodiments illustrated in FIG. 1, a switch may be employed to connect the collector emitter path of transistor TR3 in series with any of the indicators 9, 10 or 11 instead of being in series with indicator 8 thereby to provide a warning that the fuel level has fallen below the level corresponding to that associated with the particular indicator selected. In a still further variation, the indicators 8, 9, 10 and 11, in the form of incandescent lamps, may be replaced by other kinds of light emitting indicator devices, for example, light emitting semiconductors such as light emitting diodes etc.

In yet a further variation, in respect of the embodiment of FIG. 3, the interval generator may be connected in any suitable manner and by any suitable means as known to persons skilled in the art whereby the intermittent energisation of an indicator is not restricted to indicator 8 as illustrated. Indicators 9, 10 or 11 instead may be intermittently energized to provide a warning that the fuel level has fallen below the level corresponding to that associated with the particular indicator selected.

Application of the invention and of the embodiments of the invention described herein is not restricted to fluid level gauges but may be applied to any type of gauge wherein a voltage is produced related to the quantity being measured. Nor is production of a quantity level gauge according to the invention limited to a device comprising discrete components. A quantity level gauge may be provided according to the invention by integrated circuit techniques.

These and other variations may be made to the invention without departing from the spirit and scope thereof.

What is claimed is

1. Apparatus for indicating the value of an unknown quantity comprising, a plurality of light emitting indicator elements, a plurality of voltage comparators each having an output coupled to a respective one of the indicator elements to control the energization thereof, means connecting a first input each of said comparators to a common input terminal supplied with an input voltage related to the unknown quantity, means connecting a second input of each comparator to a predetermined reference voltage that is different for each comparator whereby each comparator supplies an energizing signal to its respective indicator element when the input voltage exceeds its respective reference voltage.

2. A voltage indicator as claimed in claim 1 for representing the value of a physical quantity including circuit means for connecting the comparators together so that the energisation of each indicator depends only upon the state of response of its own respective voltage comparator of the plurality irrespective of the state of response or non-response of the remaining comparators of the plurality, and means for supplying a DC energization voltage to said indicator elements and said voltage comparators.

3. Apparatus as claimed in claim 1 further comprising means for continuously energizing each indicator as long as the input voltage exceeds the reference voltage to which its respective comparator is coupled via its second input and for increasing the intensity of the indicator energization as the input voltage increases in magnitude beyond the predetermined reference voltage magnitude of its respective comparator.

4. Apparatus as claimed in claim 1 further comprising means for intermittently supplying electric energy to a chosen one of said indicators so that the chosen indicator is intermittently energized when the input voltage falls below a particular level.

5. Apparatus as claimed in claim 4 further comprising a selector switch for coupling the outputs of the comparators to the indicator elements whereby a particular indicator may be selected to be intermittently energized when the input voltage falls below said particular level.

6. Apparatus as claimed in claim 4 wherein at least one of said comparators comprises a switching circuit that exhibits a hysteresis effect such that the input voltage required to switch the comparator on is different from the input voltage at which the comparator is switched off.

7. Apparatus as claimed in claim 1 further comprising circuit means for interconnecting the indicators and the comparators so that the energization of each indicator depends jointly upon the state of response of all of said plurality of comparators in such a manner that only one indicator can be energized at a time.

8. Apparatus as claimed in claim 7 wherein said circuit means comprises, a multi-input multi-output decoder circuit arranged so that each indicator is energized by a different decoder circuit output, and means connecting each comparator output to a different input of the decoder circuit, said decoder circuit being responsive to the combined input signals applied thereto to energize only one indicator at a time.

9. Apparatus as claimed in claim 7 further comprising means for intermittently supplying electric energy to a chosen one of said comparators at a level such that the chosen comparator responds intermittently thereto when the input voltage is below the predetermined reference voltage of the chosen comparator.

10. Apparatus as claimed in claim 7 further comprising means for intermittently supplying electric energy to a chosen one of said indicators so that the chosen indicator is intermittently energized when the input voltage falls below a particular level.

11. Apparatus as claimed in claim 1 wherein at least one of said comparators comprises a switching circuit that exhibits a hysteresis effect such that the voltage level required to switch the comparator on is different from the voltage level at which the comparator is switched off, said hysteresis effect being related to variations in the input voltage due to factors other than a true variation in the value of the unknown quantity.

12. Apparatus as claimed in claim 1 further comprising means for intermittently supplying electric energy to a chosen one of said comparators at a level such that the chosen comparator responds intermittently thereto when the input voltage is below the predetermined reference voltage of the chosen comparator.

13. Apparatus as claimed in claim 1 further comprising delay means having a time constant related to the time constant of undesired transient variations of the input voltage and connected in series with the first input of at least one of said comparators.

* * * * *